US012643037B2

(12) United States Patent (10) Patent No.: US 12,643,037 B2
Xu et al. (45) Date of Patent: Jun. 2, 2026

(54) PROCESSING FOR VIBRATION GENERATION

(71) Applicant: Tencent Technology (Shenzhen) Company Limited, Shenzhen (CN)

(72) Inventors: Shili Xu, Shenzhen (CN); Lina Gao, Shenzhen (CN); Qitian Zhang, Shenzhen (CN); Zhuan Liu, Shenzhen (CN); Kai Hong, Shenzhen (CN); Yajun Zhang, Shenzhen (CN); Hao Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 252 days.

(21) Appl. No.: 18/227,566

(22) Filed: Jul. 28, 2023

(65) Prior Publication Data

US 2023/0364505 A1 Nov. 16, 2023

Related U.S. Application Data

(63) Continuation of application No. PCT/CN2022/096857, filed on Jun. 2, 2022.

(30) Foreign Application Priority Data

Jul. 5, 2021 (CN) .......................... 202110759903.8

(51) Int. Cl.
A63F 13/285 (2014.01)
A63F 13/22 (2014.01)
(Continued)

(52) U.S. Cl.
CPC ............ A63F 13/285 (2014.09); A63F 13/22 (2014.09); A63F 13/92 (2014.09); G06F 3/01 (2013.01); G06F 3/016 (2013.01); G06F 9/4411 (2013.01)

(58) Field of Classification Search
CPC ........ A63F 13/285; A63F 13/22; A63F 13/92; A63F 13/35; G06F 3/01; G06F 9/4401; G06F 9/4411; G06F 3/016
See application file for complete search history.

(56) References Cited

U.S. PATENT DOCUMENTS

| | | | | |
|---|---|---|---|---|
| 10,350,491 | B2 * | 7/2019 | Kyuma | ................... A63F 13/23 |
| 10,603,582 | B2 * | 3/2020 | Yamashita | ............ A63F 13/235 |

(Continued)

FOREIGN PATENT DOCUMENTS

| | | |
|---|---|---|
| CN | 105812567 A | 7/2016 |
| CN | 107924235 A | 4/2018 |

(Continued)

OTHER PUBLICATIONS

International Search Report issued Aug. 26, 2022 in Application No. PCT/CN2022/096857, pp. 1-12.

(Continued)

*Primary Examiner* — Carl V Larsen
(74) *Attorney, Agent, or Firm* — ArentFox Schiff LLP

(57) ABSTRACT

In a method for generating a vibration for a target vibration scenario, the target vibration scenario is determined. Vibration description information of the target vibration scenario is obtained based on a determination that the target vibration scenario is associated with the vibration. The vibration description information includes vibration parameter information of the target vibration scenario. The vibration description information is transmitted to a terminal that is configured to vibrate according to the vibration description information in the target vibration scenario.

20 Claims, 6 Drawing Sheets

(51) Int. Cl.

| | | |
|---|---|---|
| *A63F 13/92* | (2014.01) | |
| *G06F 3/01* | (2006.01) | |
| *G06F 9/4401* | (2018.01) | |

(56) References Cited

U.S. PATENT DOCUMENTS

| | | | | |
|---|---|---|---|---|
| 2014/0210758 A1* | 7/2014 | Park | ..................... | G06F 3/0482 |
| | | | | 345/173 |
| 2018/0204426 A1* | 7/2018 | Nagisetty | .............. | H04B 1/385 |
| 2019/0163271 A1* | 5/2019 | Heubel | ................ | A63F 13/285 |
| 2020/0218104 A1* | 7/2020 | Togashi | ............... | B06B 1/0622 |
| 2021/0031103 A1* | 2/2021 | Wang | .................... | A63F 13/24 |
| 2022/0221938 A1* | 7/2022 | Chen | .................... | G06F 3/0488 |
| 2023/0152891 A1* | 5/2023 | Yokoyama | ........... | G06F 3/0482 |
| | | | | 715/702 |
| 2023/0251714 A1* | 8/2023 | Huang | ............. | H04M 1/72427 |
| | | | | 340/407.1 |
| 2024/0295925 A1* | 9/2024 | Yokoyama | ......... | G06F 3/04883 |

FOREIGN PATENT DOCUMENTS

| | | |
|---|---|---|
| CN | 109213319 A | 1/2019 |
| CN | 110012308 A | 7/2019 |
| CN | 110215697 A | 9/2019 |
| CN | 112604266 A | 4/2021 |
| CN | 112933590 A | 6/2021 |

OTHER PUBLICATIONS

Chinese Office Action issued Jul. 2, 2023 in Application No. 202110759903.8, pp. 1-22.

\* cited by examiner

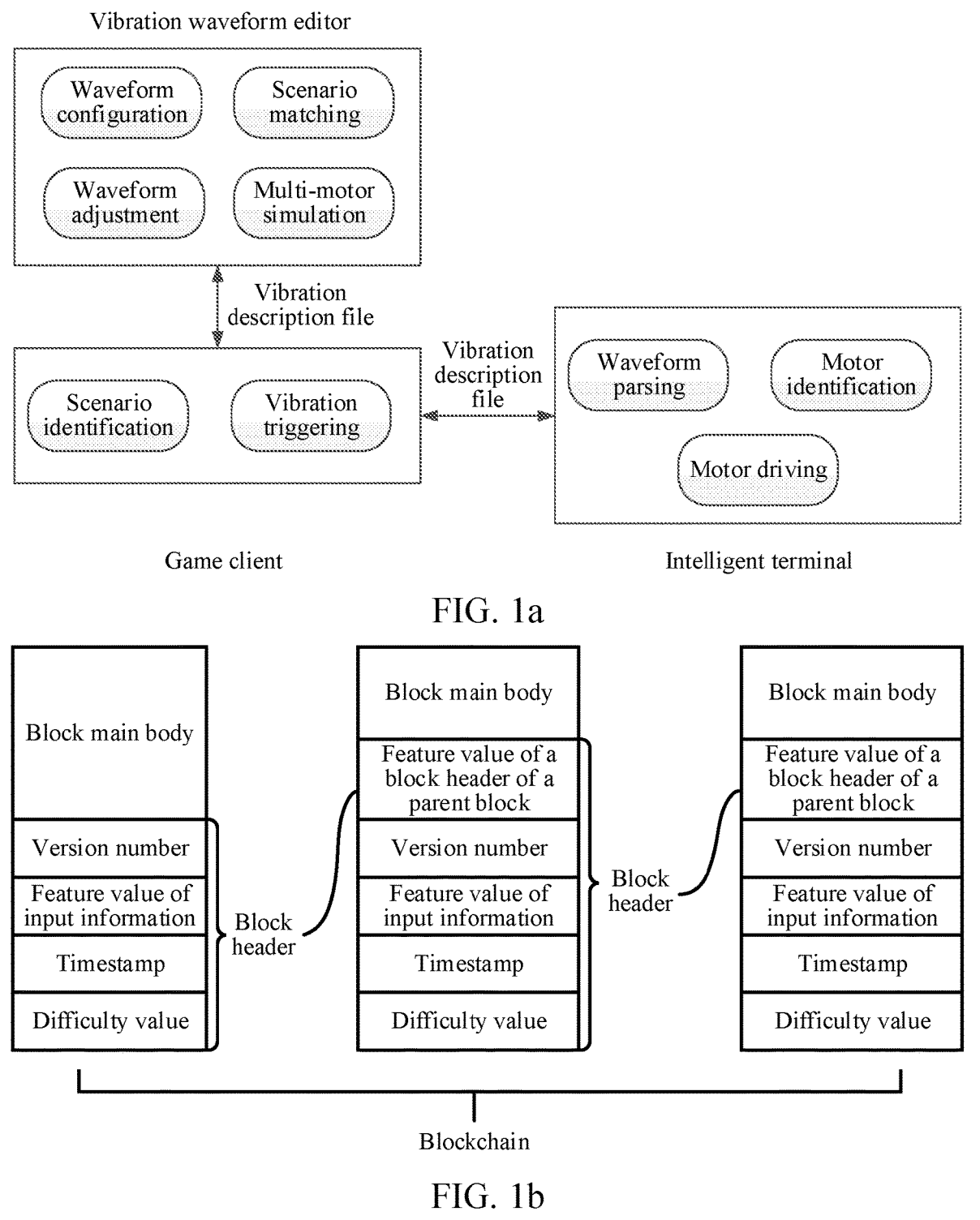

Vibration waveform editor

Waveform configuration

Scenario matching

Waveform adjustment

Multi-motor simulation

Vibration description file

Scenario identification

Vibration triggering

Vibration description file

Waveform parsing

Motor identification

Motor driving

Game client

Intelligent terminal

FIG. 1a

Block main body

Version number

Feature value of input information

Timestamp

Difficulty value

Block header

Block main body

Feature value of a block header of a parent block

Version number

Feature value of input information

Timestamp

Difficulty value

Block header

Block main body

Feature value of a block header of a parent block

Version number

Feature value of input information

Timestamp

Difficulty value

Blockchain

FIG. 1b

| Field | Type | Description | Remarks |
|---|---|---|---|
| Time | Shaping | Vibration start time, in ms | XXX |
| Duration | Shaping | Vibration duration, in ms | XXX |
| Freq | Shaping | Vibration frequency, ranging from 0 to 100 | XXX |
| Intensity | Shaping | Vibration intensity, ranging from 0 to 100 | XXX |
| Coordinate | Shaped two-dimensional data | Coordinate of the vibration source | XXX |

FIG. 6

FIG. 7

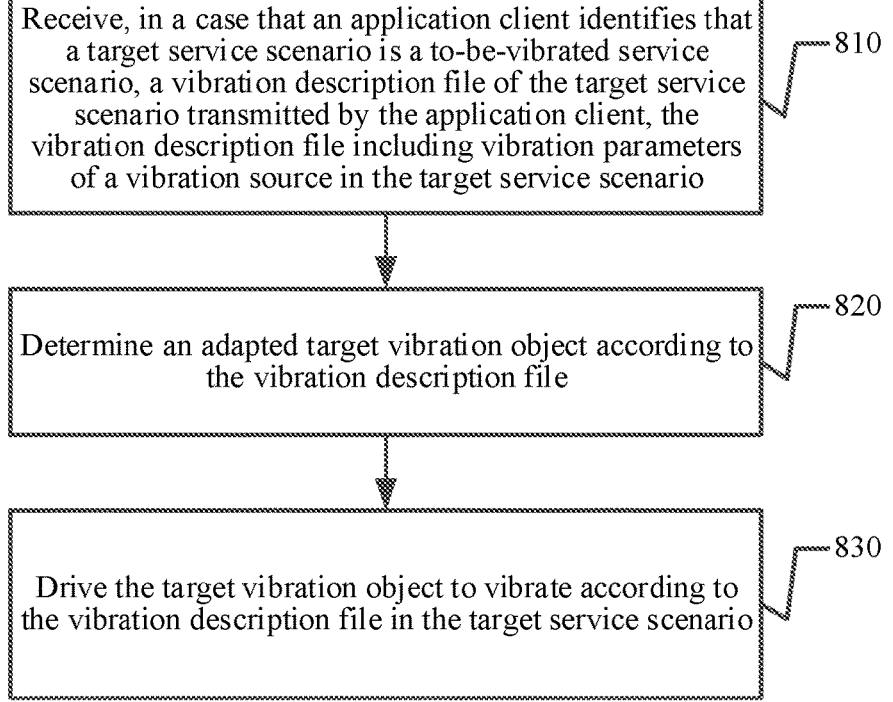

Receive, in a case that an application client identifies that a target service scenario is a to-be-vibrated service scenario, a vibration description file of the target service scenario transmitted by the application client, the vibration description file including vibration parameters of a vibration source in the target service scenario ⟋⟋810

Determine an adapted target vibration object according to the vibration description file ⟋⟋820

Drive the target vibration object to vibrate according to the vibration description file in the target service scenario ⟋⟋830

FIG. 8

First service processing apparatus 900

Second service processing apparatus 1000

PROCESSING FOR VIBRATION GENERATION

RELATED APPLICATIONS

The present application is a continuation of International Application No. PCT/CN2022/096857 filed on Jun. 2, 2022, which claims priority to Chinese Patent Application No. 202110759903.8 filed on Jul. 5, 2021. The entire disclosures of the prior applications are hereby incorporated by reference.

FIELD OF THE TECHNOLOGY

This disclosure relates to the field of computer technologies, including to service processing methods and apparatuses, an electronic device, a computer-readable storage medium, and a computer program product.

BACKGROUND OF THE DISCLOSURE

Terminals may be configured with one or more vibration generators, for example, a single motor or multiple motors, to enable the terminals to support vibration output. At present, terminals adapt to these vibration generators according to their own policies. However, adaptation schemes based on vibration generators in existing terminals cannot adapt well to different service scenarios, which can result in unstable vibration effects.

SUMMARY

Embodiments of this disclosure provide service processing methods and apparatuses, an electronic device, a non-transitory computer-readable storage medium, and a computer program product. Vibration generators in service terminals can be adapted on the basis of service scenarios, thereby providing vibration effects that can better match scenario requirements of the service scenarios.

The embodiments of this disclosure provide a method for generating a vibration for a target vibration scenario. In the method, the target vibration scenario is determined. Vibration description information of the target vibration scenario is obtained based on a determination that the target vibration scenario is associated with the vibration. The vibration description information includes vibration parameter information of the target vibration scenario. The vibration description information is transmitted to a terminal that is configured to vibrate according to the vibration description information in the target vibration scenario.

The embodiments of this disclosure provide a method for generating a vibration for a target vibration scenario. In the method, vibration description information of a target vibration scenario is received. The vibration description information is received based on a determination that the target vibration scenario is associated with the vibration. The vibration description information includes vibration parameter information of the target vibration scenario. An adapted target vibration object is determined according to the vibration description information. The target vibration object is driven to vibrate according to the vibration description information in the target vibration scenario.

The embodiments of this disclosure provide a first information processing apparatus, including processing circuitry. The processing circuitry is configured to determine the target vibration scenario. The processing circuitry is configured to obtain vibration description information of the target vibration scenario based on a determination that the target vibration scenario is associated with the vibration. The vibration description information includes vibration parameter information of the target vibration scenario. The processing circuitry is configured to transmit the vibration description information to a terminal that is configured to vibrate according to the vibration description information in the target vibration scenario.

The embodiments of this disclosure provide a second information processing apparatus, including processing circuitry. The processing circuitry is configured to receive vibration description information of a target vibration scenario. The vibration description information is received based on a determination that the target vibration scenario is associated with the vibration. The vibration description information includes vibration parameter information of the target vibration scenario. The processing circuitry is configured to determine an adapted target vibration object according to the vibration description information. The processing circuitry is configured to drive the target vibration object to vibrate according to the vibration description information in the target vibration scenario.

The embodiments of this disclosure provide an electronic device. The electronic device includes a memory and a processor. The memory stores a computer program. The computer program, when run on the processor, implements the method applied to an application client side, or the method applied to a terminal side.

The embodiments of this disclosure provide a non-transitory computer-readable storage medium. The computer-readable storage medium stores a computer program. The computer program, when read and run by a processor of an electronic device, implements the method applied to an application client side, or the method applied to a terminal side.

The embodiments of this disclosure provide a computer program product or a computer program. The computer program product or computer program includes computer instructions which are stored in a computer-readable storage medium. A processor of the electronic device reads the computer instructions from the computer-readable storage medium, and the processor executes the computer instructions to implement the method applied to an application client side, or the method applied to a terminal side.

In the embodiments of this disclosure, when identifying that the target service scenario is a to-be-vibrated scenario, the application client can obtain a vibration description file of the target service scenario, the vibration description file including vibration parameters of a vibration source in the target service scenario. The application client transmits the vibration description file to the service terminal. The service terminal finds the target vibration object on the basis of the vibration description file, and drives the target vibration object to vibrate according to the vibration description file in the target service scenario, so that the service terminal finds the vibration object on the basis of an actual requirement of the service client. The target vibration object matching the target service scenario can be selected to provide a vibration service for the target service scenario, and it is also ensured that a vibration effect of the target vibration object meets the scenario requirement of the target service scenario. Therefore, the stability of the vibration effect can be improved.

BRIEF DESCRIPTION OF THE DRAWINGS

To describe the technical solutions in embodiments of this disclosure more clearly, the following briefly describes the accompanying drawings. The accompanying drawings in the following description show merely some embodiments of this disclosure. Other embodiments are within the scope of the present disclosure.

FIG. 1a is a schematic diagram of a service processing scheme according to an embodiment of this disclosure.

FIG. 1b is a schematic structural diagram of a blockchain according to an embodiment of this disclosure.

FIG. 6 is a schematic diagram of a vibration description file according to an embodiment of this disclosure.

FIG. 7 is a flowchart of waveform generation of a game scenario according to an embodiment of this disclosure.

FIG. 8 is a schematic diagram of a scenario of another service processing method according to an embodiment of this disclosure.

DESCRIPTION OF EMBODIMENTS

Figure 1C:
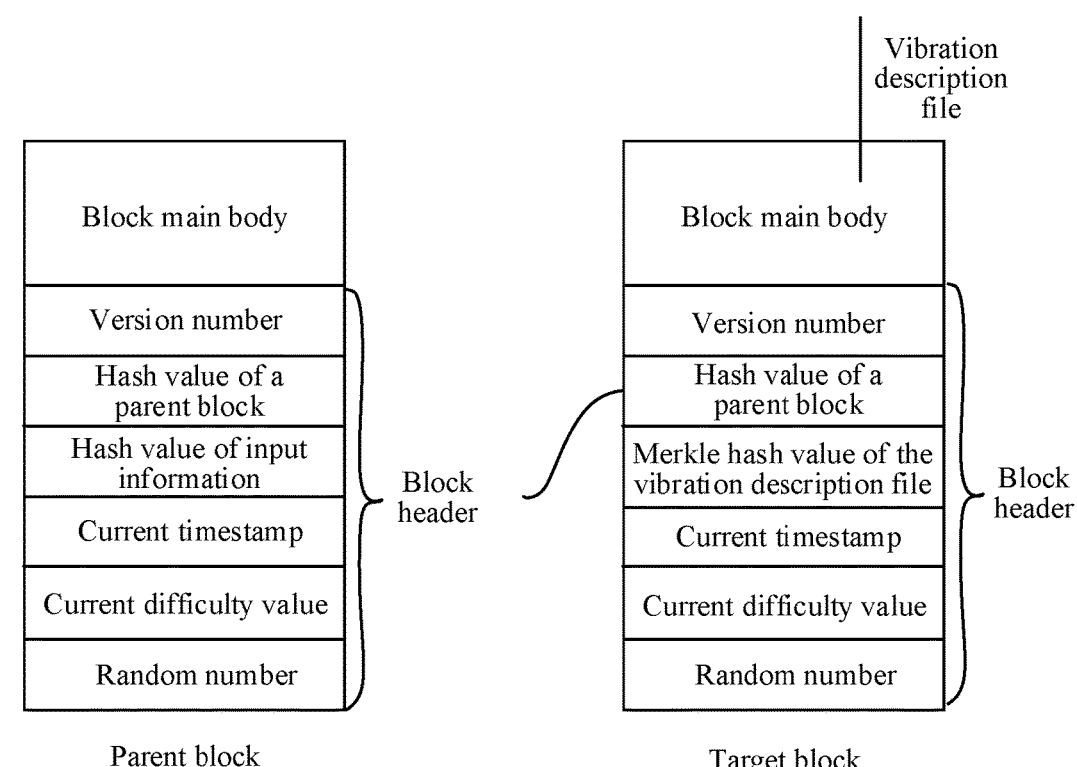
FIG. 1c is a schematic structural diagram of another blockchain according to an embodiment of this disclosure.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with this disclosure. On the contrary, the implementations are merely examples of apparatuses and methods that are consistent with some aspects of this disclosure.

The embodiments of this disclosure provide a service processing method for adapted vibration based on an application client and a service terminal. The service processing method first configures a vibration description file of a target service scenario that needs to be vibrated in advance, and then transmits the configured vibration description file of the target service scenario to a service terminal through an application client corresponding to the target service scenario, so that after receiving the vibration description file of the target service scenario, the service terminal finds a corresponding target vibration object (such as a motor), and drives the target vibration object to vibrate, thereby outputting a vibration waveform that matches the target service scenario and meets a scenario requirement of the target service scenario, which can improve a vibration effect of the target service scenario. The target service scenarios can include but are not limited to a virtual scenario such as a game scenario, a live streaming scenario, and an information exchange scenario. The application client refers to a client configured to run the target service scenario, including but not limited to an application (APP), a website, and a mini program. For example, if the target service scenario is a game scenario, the application client is a game APP corresponding to the game scenario. The application client is run on the service terminal, and interface elements (such as a scene picture, characters in the scene, and operation controls) in the target service scenario are displayed on the basis of a running environment (a hardware or software environment) provided by the service terminal. Various interactions in the target service scenario, and the like are achieved in response to various operations in the target service scenario. The service terminal can include but is not limited to: a mobile phone, a computer, a handheld device, a vehicle-mounted device, and the like.

By way of example, a principle of the service processing method according to the embodiments of this disclosure is described in further detail by taking the target service scenario as a target game scenario, the application client as a game client, and the service terminal as an intelligent terminal running the game client.

FIG. 1a is a schematic diagram of a scenario of a service processing method according to an embodiment of this disclosure. A scenario of the service processing method is explained with reference to FIG. 1a.

(1) First, the game client performs scenario identification and vibration triggering. That is, on the game client side, the game client may determine, in response to an operation of a game developer on the basis of the scenario requirement of the target service scenario, whether the target service scenario needs to trigger vibration; and determine, if it is determined that vibration is required, a vibration source in the target service scenario. For example, according to the design of a game, when game character A appears in a certain game scenario, vibration needs to be triggered. The game scenario can be the target service scenario, and the vibration source in the target service scenario is game character A. In another example, when game character A in a certain game scenario needs to perform an operation of triggering vibration, such as rotation, jumping, and shooting, it can be determined that game character A needs to trigger vibration at this time. The game scenario can be the target service scenario, and the vibration source in the target service scenario is game character A.

Second, when a game developer uses a vibration waveform editor to configure a vibration waveform for the vibration source in the target service scenario that needs to be vibrated, the vibration waveform editor also receives a vibration waveform setting operation. Thus, the vibration waveform editor configures a vibration waveform for the vibration source in the target service scenario in response to the vibration waveform setting operation, to achieve waveform configuration. It is understood that the target service scenario may include a plurality of vibration sources. The plurality of vibration sources can correspond to the same vibration waveform (that is, the plurality of vibration sources generate the same vibration effect), and each of the plurality of vibration sources can correspond to one vibration waveform (that is, each vibration source generates different vibration effects).

Again, when the game developer uses the vibration waveform editor to edit a vibration waveform of a vibration source, the vibration waveform editor also receives a vibration waveform editing operation. Thus, the vibration waveform editor achieves, in response to the vibration waveform editing operation, waveform adjustment and multi-motor simulation by editing the vibration waveform, thereby obtaining a vibration description file of the target service scenario.

In the embodiments of this disclosure, editing a vibration waveform may include the following five steps. The various steps will be explained separately below.

In a first step, the game client invokes the vibration waveform editor to adjust a vibration waveform, to obtain initial parameters of a vibration source. The adjustment process includes: outputting a waveform according to a configuration of the vibration waveform, and continuously adjusting parameters to ensure that the output waveform is kept as consistent as possible with the configured vibration waveform; and determining, when the output waveform is consistent with the configured vibration waveform, parameters corresponding to the output waveform as the initial parameters of the vibration source. The initial parameters may include an initial attribute parameter and an initial control parameter of the vibration source.

In a second step, the vibration waveform editor may perform vibration simulation according to the initial parameters of the vibration source. The vibration simulation process is a process of simulating vibration of the vibration source on the basis of the initial parameters of the vibration source through software (such as a program code) or hardware (such as a motor and a sensor).

In a third step, the vibration waveform editor compares a matching degree between a vibration effect generated by the vibration simulation and a designated vibration effect corresponding to the target service scenario. The matching degree is used for measuring a degree of matching between the vibration effect generated by vibration simulation and the designated vibration effect corresponding to the scenario requirement of the target service scenario. If the matching degree is greater than a set threshold, it indicates that the vibration effect generated by the vibration simulation meets the scenario requirement of the target service scenario. On the contrary, if the matching degree is not greater than the set threshold, it indicates that the vibration effect generated by the vibration simulation does not meet the scenario requirement of the target service scenario. It is necessary to optimize the initial parameters to ensure that a vibration effect of final vibration simulation can meet the scenario requirement of the target service scenario.

In a fourth step, the vibration waveform editor optimizes the initial parameters of the vibration source according to the matching degree after vibration simulation to obtain the vibration parameters of the vibration source. For example, if it is found according to the matching degree that when the vibration source vibrates at a position indicated by the initial attribute parameter, the vibration effect generated by the initial attribute parameter does not meet the scenario requirement of the target service scenario, and a game interaction experience generated is relatively poor compared with the scenario requirement of the target service scenario. At this time, the vibration source may vibrate again by changing the position indicated by the initial attribute parameter, to optimize the initial attribute parameter of the initial parameters of the vibration source, so that the vibration source vibrates at an appropriate position. In another example, if it is found according to the matching degree that when the vibration source vibrates according to vibration intensity indicated by the initial control parameter, the vibration effect generated by the initial attribute parameter does not meet the scenario requirement of the target service scenario, and a game interaction experience generated is relatively poor compared with the scenario requirement of the target service scenario. At this time, the initial control parameter of the initial parameters of the vibration source may be adjusted to be optimized to appropriate vibration intensity. It is understood that vibration is performed according to the optimized vibration parameters of the vibration source, and a vibration waveform that matches the scenario requirement of the target service scenario can be obtained.

In the fourth step, the vibration waveform editor generates a vibration description file of the target service scenario according to the optimized vibration parameters of the vibration source. A vibration description file of a target game scenario may include the vibration parameters of the vibration source (such as game character A) in the target game scenario, and the vibration parameters may include an attribute parameter of the vibration source and a control parameter set for the vibration source. The attribute parameter here may include but is not limited to any one of the following: a position, orientation, and coordinate of the vibration source (such as game character A) in the target game scenario. The control parameter may be any one of the following, for example: vibration start time, vibration end time, a vibration duration, a frequency of vibration (referred to as a vibration frequency), and intensity of vibration (referred to as vibration intensity).

(2) In the running process of the game application, if the game client identifies that the target game scenario is a game scenario that needs to be vibrated, the game client obtains the vibration description file of the target game scenario.

(3) The game client may transmit the vibration description file of the target game scenario to an intelligent terminal. After obtaining the vibration description file of the target game scenario transmitted by the game client, the intelligent terminal performs waveform parsing on the basis of the vibration description file, and finds, according to a distribution of motors of the intelligent terminal, a target motor (referred to as a target vibration object) that matches the vibration source, to achieve motor identification. For example, a picture of the target game scenario is displayed in full screen on a screen of the intelligent terminal. The target motor is found according to a coordinate of the vibration source in the target game scenario, namely, a distribution position of the target motor in the intelligent terminal is the same as or close to the coordinate (a distance difference between the distribution position and the coordinate is less than a designated distance). Thus, the intelligent terminal drives the adapted target motor to vibrate to achieve motor driving. It is understood that since the distribution position of the target motor is the same as or close to the coordinate of the vibration source, in the game process, the vibration of the target motor makes a user feel like that the vibration source (game character A) is vibrating, which can improve the vibration effect and improve the game experience.

It is also understood that in the embodiments of this disclosure, the game client sets, on the basis of the scenario requirements of the target game scenario, the vibration waveform of the target game scenario by invoking the vibration waveform editor, thereby providing the initial vibration parameters; and adjusts the vibration waveform in combination with interactions between the intelligent terminal and the game client, so as to confirm and output the final vibration parameters on the intelligent terminal side. Therefore, the embodiments of this disclosure not only consider the requirement of the game client, but also takes into account vibration characteristics of the intelligent terminal itself, so as to achieve adaptive intelligent vibration according to different scenarios and objects, thereby improving the vibration effect.

In the embodiments of this disclosure, the service processing method according to the embodiments of this disclosure can be combined with a blockchain technology. For example, data such as the vibration description files of target service scenarios and the vibration ability information of the service terminal can be uploaded to a blockchain for storage, ensuring that these data on the blockchain are not easily tampered with.

A blockchain is an application mode of computer technologies such as distributed data storage, peer to peer transmission, a consensus mechanism, and an encryption algorithm. The blockchain includes a decentralized database and is a string of data blocks generated through association by using a cryptographic method. Each data block includes information of a batch of network transactions, the information being used for verifying the validity of information of the data block (anti-counterfeiting) and generating a next data block. As shown in FIG. 1b, the blockchain may be composed of a plurality of blocks. A first block may be referred to as an originator block. The originator block includes a block header and a block main body. The block header stores a feature value, a version number, a timestamp and a difficulty value of the input information, and the block main body stores the input information. A next block of the originator block takes the originator block as a parent block. The next block also includes a block header and a block main body. The block header stores a feature value of the input information of the current block, and the feature value, the version number, the timestamp and the difficulty value of the block header of the parent block, and the rest can be done in the same manner, so that block data stored in each block in the blockchain is associated with block data stored in the parent block, which ensures the security of the input information in the blocks.

Based on this, a specific implementation of how to store the data to the blockchain is explained by taking storage of the vibration description file to the blockchain as an example. First, the vibration description file may be added to a block main body of a target block, and a hash operation may be performed on a style file in the block main body to obtain a Merkle hash value. Second, a random algorithm may be used to generate a random number, and the calculated Merkle hash value, the random number, a version number, a hash value of a previous block, a current timestamp, and a current difficulty value are used to form a block header of the target block, as shown in FIG. 1c. The version number is version information of relevant block protocols in the blockchain. The hash value of the parent block refers to the feature value of the block header of the previous block. The current timestamp refers to system time when the block header is formed. The current difficulty value refers to a difficulty value of calculation. The difficulty value is a fixed value within a fixed time period and is determined again when it is beyond the fixed time period. A feature value algorithm (such as SHA256 algorithm) can be used to perform one or more hash operations on a content contained in the block header to obtain the feature value of the block header of the target block. The number of hash operations here may be determined according to a calculation difficulty. A higher calculation difficulty indicates more hash operations. After the target block is obtained on the basis of the above steps, the target block may be broadcast to various consensus nodes in the blockchain network for consensus processing. After the consensus processing succeeds, the target block is added to the blockchain.

Figure 2:
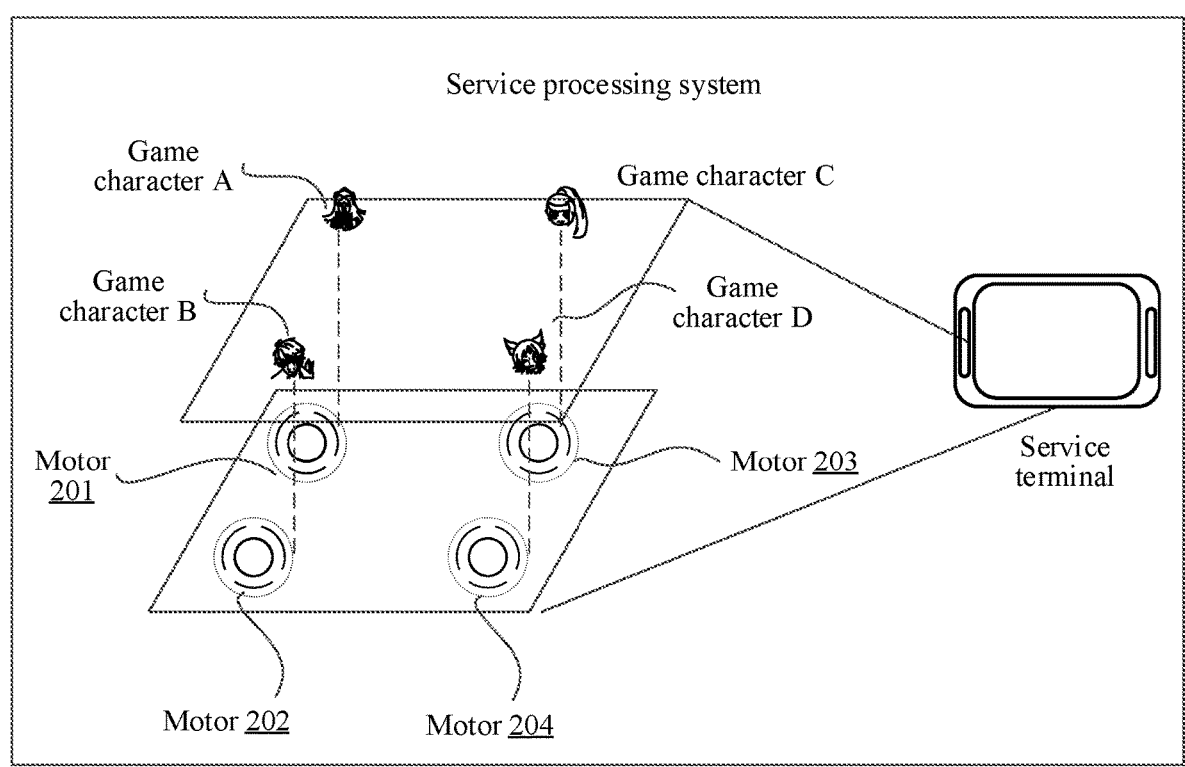
FIG. 2 is a schematic diagram of an architecture of a service processing system according to an embodiment of this disclosure.

FIG. 2 is a schematic diagram of an architecture of a service processing system according to an embodiment of this disclosure. The architecture of the service processing system may include: an application client and a service terminal. The application client may be an application run on the service terminal, that is, a program that will be run until it is installed in an operating system, such as a game application or an instant messaging application. The application client may also be a mini program run on the service terminal, or the application client may be a website, that is, a program that can be run after being simply downloaded to a browser environment. The application client may also be a native program or software module in the operating system. In addition, the service terminal may be a mobile phone, a tablet, a laptop, a handheld computer, a Mobile Internet Device (MID), a vehicle, a vehicle-mounted device, a roadside device, an aircraft, a wearable device, a smart television, and the devices with service processing functions, such as a smart watch, a smart wristband, and a pedometer.

In this embodiment of this disclosure, the application client identifies a target service scenario. If the application client identifies that the target service scenario is a service scenario that needs to be vibrated, and determines that the target service scenario is a to-be-vibrated service scenario, the application client obtains a vibration description file of the target service scenario, where the vibration description file of the target service scenario includes vibration parameters of a vibration source in the target service scenario. The application client transmits the vibration description file of the target service scenario to the service terminal. After obtaining the vibration description file of the target service scenario, the service terminal may drive an adapted target vibration object to vibrate according to the vibration description file of the target service scenario in the target service scenario.

In this embodiment of this disclosure, if the application client identifies that the target service scenario is the to-be-vibrated service scenario, the service terminal may receive the vibration description file of the target service scenario transmitted by the application client. The service terminal then determines the adapted target vibration object according to the vibration description file of the target service scenario. Finally, the service terminal drives the target vibration object to vibrate according to the vibration description file of the target service scenario in the target service scenario.

For example, if the target service scenario is a game scenario, the service terminal may drive, in each game scenario of the game scenario, one or more adapted motors (referred to as the target vibration object) to correspondingly vibrate according to a vibration description file corresponding to the game scenario transmitted by the application client. Furthermore, on the basis of the vibrations of the one or more motors in the service terminal, page rendering may be performed in a user interface according to vibration conditions of these motors, thereby providing intuitive and rich game pictures for a user.

Next, by way of example, the target service scenario is a game scenario, which is used to make relevant explanation on the principle of applying the service processing system according to the embodiments of this disclosure to the game scenario. If a picture of a target game scenario is displayed in full screen on a screen of the service terminal, a target motor is found according to a coordinate of a vibration source in the target game scenario, namely, a distribution position of the target motor in the service terminal is the same as or close to the coordinate. Thus, the service terminal drives the adapted target motor to vibrate. As shown in FIG. 2, in the service processing system, the picture of the target game scenario includes four vibration sources that need to be vibrated: game character A, game character B, game character C, and game character D. According to coordinates of the four game characters in the game picture, motors having distribution positions (such as coordinates) that are the same as or close to the coordinates of the four game characters in the game picture may be determined from the terminal. Therefore, a target motor that matches game character A in the service terminal may be motor 201; a target motor that matches game character B in the service terminal may be motor 202; a target motor that matches game character C in the service terminal may be motor 203; and a target motor that matches game character D in the service terminal may be motor 204. When game character A needs to trigger vibration to perform a shooting operation, in the service processing method according to the embodiments of this disclosure the service terminal may drive motor 201 to vibrate according to vibration parameters of the vibration source (game character A). When game character C needs to trigger vibration to perform a moving operation, in the service processing method according to the embodiments of this disclosure the service terminal may drive motor 203 to vibrate according to vibration parameters of the vibration source (game character C).

In addition, if the picture of the target game scenario is displayed in non-full screen (for example, at a display ratio of 75%, 50%, or the like) on the screen of the service terminal, the service terminal may first convert, according to the display ratio, a coordinate of a vibration source in the target game scenario into a corresponding coordinate when the picture is displayed in full screen, and then find out a target motor having a distribution position that is the same as or close to the converted coordinate from the service terminal. Thus, the service terminal drives the adapted target motor to vibrate.

The service processing system provided in the embodiments of this disclosure to implement the service processing method can be deployed on a node of the blockchain, for example, the service terminal may be regarded as a node device of the blockchain, to jointly form a blockchain network. Therefore, in the embodiments of this disclosure, a service processing flow of obtaining the vibration description file of the target service scenario may be executed on the blockchain. This not only ensures the fairness and impartiality of the service processing flow, but also makes the service processing flow traceable, thereby improving the security of the service processing flow.

It is understood that the schematic diagram of the architecture of the service processing system described in the embodiments of this disclosure is for more clearly describing the technical solutions in the embodiments of this disclosure, and does not constitute a limitation on the technical solutions provided in the embodiments of this disclosure. Persons of ordinary skill in the art may recognize that, with evolution of a network architecture and appearance of a new service scenario, the technical solutions provided in the embodiments of this disclosure are also applicable to a similar technical problem.

Figure 3:
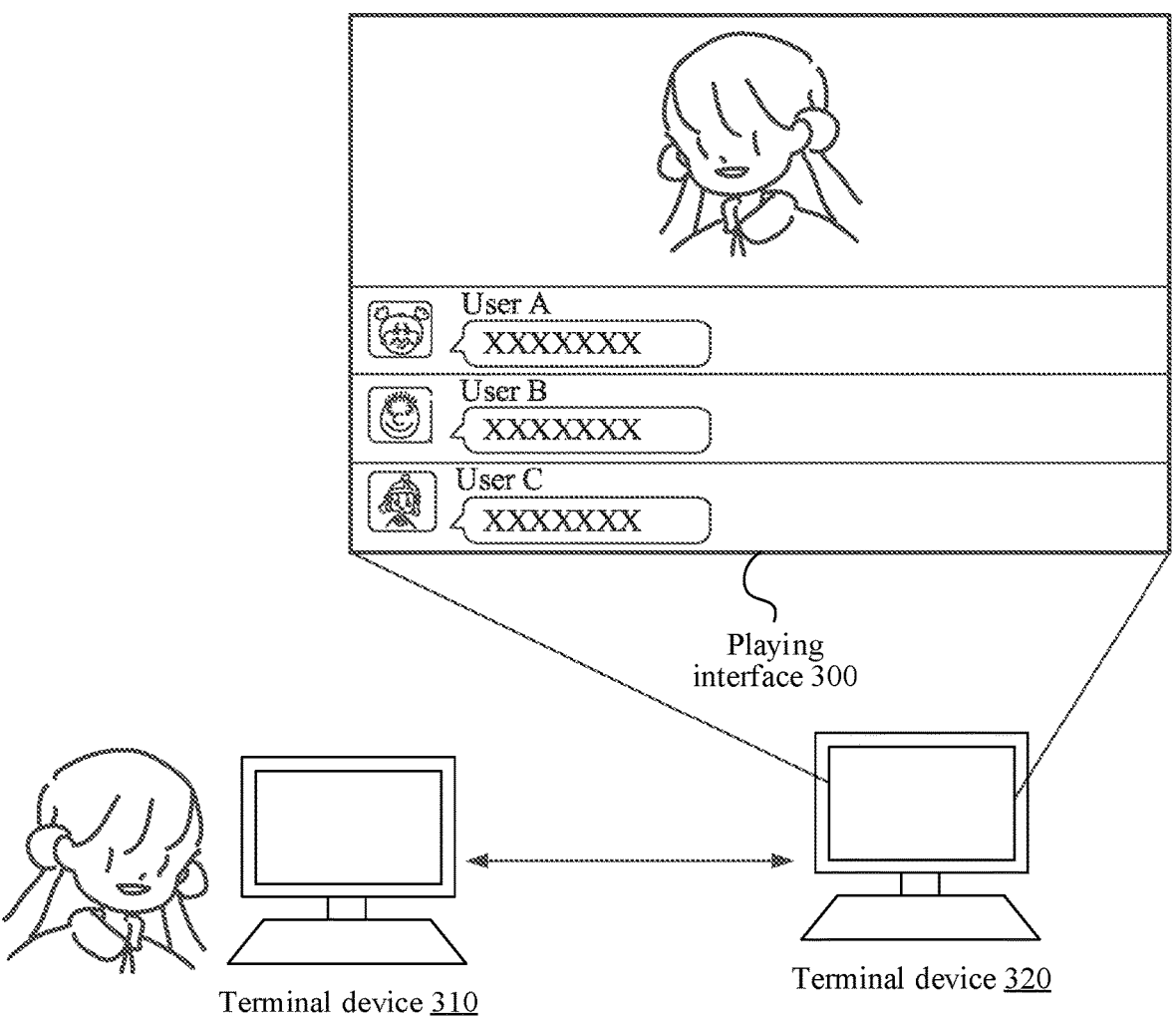
FIG. 3 is a schematic diagram of a scenario of a service processing method according to an embodiment of this disclosure.

Next, by way of example, the target service scenario is a video live streaming scenario, which is used to explain the service processing method according to the embodiments of this disclosure. Referring to FIG. 3, FIG. 3 is a schematic diagram of a scenario of a service processing method according to an embodiment of this disclosure. As shown in FIG. 3, when the service processing method is applied to a video live streaming scenario, an application client may be an APP used for achieving a video live streaming service. The APP is run on a terminal device 320 used by an audience user, and the terminal device 320 used by the audience user is the service terminal described in the embodiments of this disclosure. Moreover, a communication connection may be established between a terminal device 310 used by a live streamer user and the terminal device 320 used by the audience user in a wired or wireless manner. The following will explain an application process of the service processing method to the video live streaming scenario.

In a live streaming scenario, the terminal device 320 may synchronize live streaming picture scenarios of the live streamer user in real time, and obtain, when identifying that a certain live streaming picture scenario needs to trigger vibration, a vibration description file corresponding to the live streaming picture scenario. The vibration description file includes vibration parameters of a vibration source in the live streaming picture scenario. In this embodiment of this disclosure, the vibration parameters of the vibration source may include an attribute parameter of the vibration source (for example, the live streamer user) in the live streaming picture scenario, and the attribute parameter may include any one of the following: a coordinate and an orientation. In this embodiment of this disclosure, the vibration parameters of the vibration source may be the coordinate of the vibration source, and there is a one-to-one correspondence relationship between the coordinate of the vibration source and a vibration object. Thus, after the terminal device 320 obtains the vibration description file corresponding to the current live streaming picture scenario, the terminal device drives a corresponding target vibration object (for example, a motor) to vibrate according to the obtained vibration description file in the current live streaming picture scenario. There may be one or more vibration objects required for vibration, and this embodiment of this disclosure does not specifically limit this.

Of course, in the video live streaming scenario, the terminal device 320 may obtain the vibration description file in a following way. After the live streamer user starts live streaming, the terminal device 320 may obtain general-purpose vibration description files set or defined by a developer in advance, and determine, when identifying each to-be-vibrated live streaming picture scenario, the vibration description file corresponding to the current to-be-vibrated live streaming picture scenario from these general-purpose vibration description files. The terminal device 320 may obtain the vibration description file in another way below: When identifying the current to-be-vibrated live streaming picture scenario, the terminal device 320 obtains the vibration description file corresponding to the current to-be-vibrated live streaming picture scenario in real time. This embodiment of this disclosure does not specifically limit this.

In the process of driving the corresponding target vibration object (for example, the motor) to vibrate according to the obtained vibration description file in the current live streaming picture scenario, the terminal device 320 may display a current live streaming picture in real time to the audience user in a playing interface 300 of the terminal device 320. For example, the playing interface 300 may include a real-time live streaming picture shown by the live streamer user, as well as comments posted in a comment area by other online audiences (user, user B, user C, and the like) currently watching the current live streaming.

In addition, personalized configurations can also be made on the basis of different types of terminal devices. For example, if the terminal device is a mobile phone, a vibration condition of an adapted vibration object when the audience user watches the video live streaming scenario of the live streamer user on the mobile phone may be different from a vibration condition of the adapted vibration object when the audience user watches the video live streaming scenario of the live streamer user on a computer. Or, personalized configurations can be made for terminal devices based on different operating systems. For example, if the operating system of the terminal device is an Android operating system, a vibration condition of an adapted vibration object when the audience user watches the video live streaming scenario of the live streamer user on the terminal device using the Android operating system may be different from a vibration condition of the adapted vibration object when the audience user watches the video live streaming scenario of the live streamer user on a terminal device using an iOS operating system.

This embodiment of this disclosure determines the target vibration object that the service terminal needs to drive in the target service scenario by matching the vibration description file configured by the user in advance with the vibration object included in the service terminal, and vibrates the target vibration object according to the vibration description file configured by the user in advance, achieving a matching effect between the service terminal and the application client.

Figure 4:
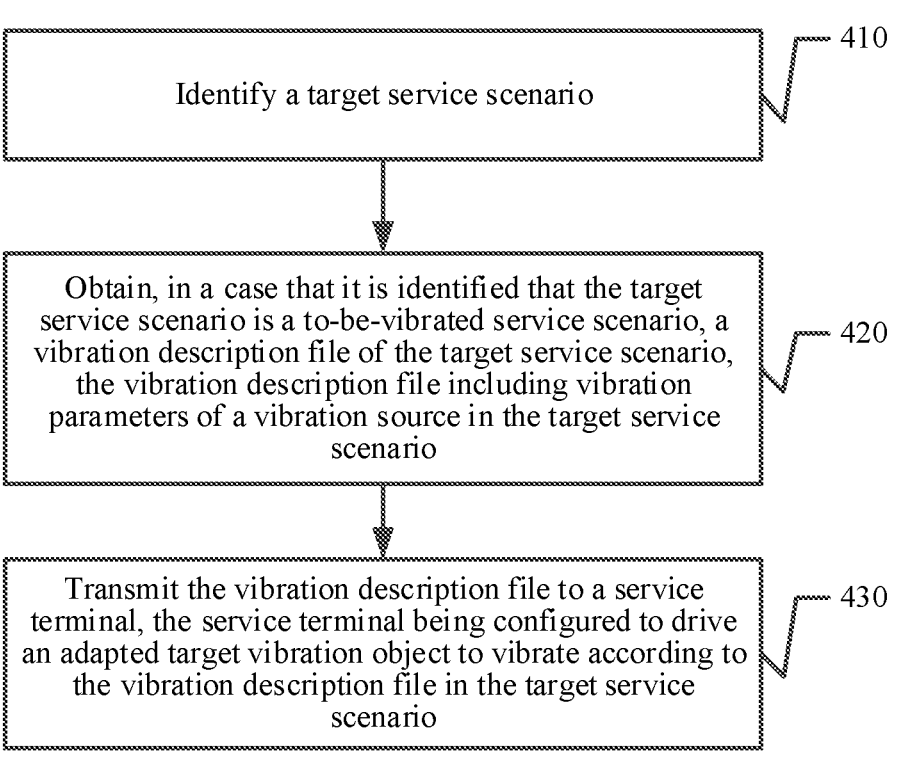
FIG. 4 is a flowchart of a service processing method according to an embodiment of this disclosure.

The following will describe the service processing method of this disclosure with reference to FIG. 4 on the basis of the above analysis. FIG. 4 is a flowchart of a service processing method according to an embodiment of this disclosure. The service processing method may be performed by an application client. The application client may be, for example, an application, such as a game client, a live streaming client, and instant messaging client, etc. The application client may also be a mini program, a website, or the like. As shown in FIG. 4, the service processing method may include step 410 to step 430. The various steps will be explained below separately.

In step 410, a target service scenario is identified.

A target service scenario can be any game scenario in a game application, such as a scenario where two game characters engage in fighting, interaction, or the like, or a scenario where any game character rotates, jumps, or moves. Of course, a target service scenario may also be any live streaming scenario in a live streaming application. The live streaming scenario may be a video live streaming scenario, or the live streaming scenario may be an audio live streaming scenario, for example, a live streaming scenario where a live streamer user performs a talent show (such as dancing and singing) with a live streaming platform. In addition, a target service scenario may also be any information exchange scenario in an instant messaging application, for example, a scenario where two or more social users chat in a chat group of the instant messaging application, a scenario where any social user receives and browses social information on a social platform, or the like. This embodiment of this disclosure does not specifically limit the target service scenario.

In step 420, in a case that it is identified that the target service scenario is a to-be-vibrated service scenario, a vibration description file of the target service scenario is obtained, the vibration description file including vibration parameters of a vibration source in the target service scenario.

In this embodiment of this disclosure, when identifying the target service scenario, the application client determines a scenario type of the target service scenario. If the application client determines that the target service scenario is a service scenario that needs to be vibrated, the application client determines that the target service scenario is the to-be-vibrated service scenario, thereby triggering the step of obtaining a vibration description file of the target service scenario. For example, if the target service scenario is a game scenario where two game characters engage in fighting, interaction, or the like, or if the target service scenario is a live streaming scenario where a live streamer user performs a talent show (such as dancing and singing) with a live streaming platform, it can be determined that the target service scenario is a service scenario that needs to be vibrated.

In this embodiment of this disclosure, the application client may obtain the vibration description file of the target service scenario in advance, that is, the application client may obtain the vibration description file of the target service scenario by responding to an operation of the developer for configuring the vibration description file of the target service scenario in advance. Of course, the application client may obtain the vibration description file of the target service scenario in real time during the running of the target service scenario. That is, after identifying that the target service scenario is the to-be-vibrated service scenario, the application client obtains the vibration description file of the target service scenario. This embodiment of this disclosure does not specifically limit time for obtaining the vibration description file of the target service scenario by the application client.

The vibration description file of the target service scenario includes vibration parameters of a vibration source in the target service scenario. The vibration parameters include an attribute parameter of the vibration source in the target service scenario, and a control parameter configured for the vibration source in the target service scenario. The attribute parameter includes any one of the following: a coordinate and an orientation. The control parameter includes at least one of the following: vibration start time, a vibration duration, vibration end time, a vibration frequency, and vibration intensity.

It is understood that in the attribute parameter of the vibration source, the coordinate refers to a coordinate corresponding to a position of the vibration source in a scenario picture of the target service scenario. The orientation refers to a direction from a center point of the scenario picture of the target service scenario to the position of the vibration source.

In this embodiment of this disclosure, the vibration source refers to a service object that needs to be vibrated in the target service scenario. For example, if the target service scenario is the game scenario, the vibration source may be a game character in the game scenario. The vibration object refers to a hardware device that can perform a vibration operation, for example, the vibration object may be a motor, a sensor, or another device. Attribute parameters of the vibration object may include a coordinate, which, for example, may be represented as (x1, y1), (x2, y2), and the like. The attribute parameters of the vibration object may include an orientation, which, for example, may be represented as east, south, west, north, and the like. It is understood that among the attribute parameters of the vibration object, the coordinate refers to a coordinate corresponding to a distribution position of the vibration object in the service terminal entity; and the orientation refers to a direction from a center point of the service terminal to the distribution position of the vibration object in the service terminal entity. When the scenario picture of the target service scenario is displayed in full screen on a screen of the service terminal, the center point of the scenario picture of the target service scenario overlaps with the center point of the service terminal.

In the target service scenario, the vibration source and the vibration object in the service terminal are in one-to-one correspondence. For example, if the vibration source is any game character in the game scenario, the vibration object may be a motor corresponding to the game character in the game scenario. For example, in a certain game picture, the game picture is displayed in full screen on the user interface of the service terminal. Game character A and game character B need to fight with each other. A coordinate of game character A in the game picture is (x1, y1), and game character A needs to continue the fighting for 10 milliseconds (ms) in the fighting process, with a vibration frequency of 50 and vibration intensity of 80. A coordinate of game character B in the game picture is (x2, y2), and game character B needs to continue fighting for 12 ms in the fighting process, with a vibration frequency of 60 and vibration intensity of 70. The motor that matches game character A may be motor 1 with a distribution position of (x1, y1) in the service terminal, or motor 1 having a distribution position close to (x1, y1) (that is, a distance between the distribution position and (x1, y1) is less than a distance threshold). The motor that matches game character B may be motor 2 with a distribution position of (x2, y2) in the service terminal, or motor 2 having a distribution position close to (x2, y2) (that is, a distance between the distribution position and (x2, y2) is less than the distance threshold). The coordinate of the vibration source and the coordinate of the vibration object may not necessarily be the same, as long as the coordinates cause the vibration source and the vibration object to adapt to each other.

The application client may obtain a vibration ability of the service terminal, and then update the vibration description file of the target service scenario according to the vibration ability of the service terminal, so that the updated vibration description file of the target service scenario matches the vibration ability of the service terminal. The application client may obtain the vibration ability of the service terminal in a way below: obtaining vibration ability information of the service terminal by invoking an application program interface (API) provided by the service terminal, the vibration ability information being used for indicating the vibration ability of the service terminal, the vibration ability information including M vibration objects in the service terminal and attribute parameters of the M vibration objects, and M being a positive integer.

Figure 5A:
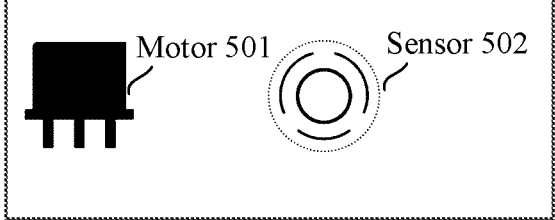
FIG. 5a is a schematic diagram of a distribution of vibration objects of a service terminal according to an embodiment of this disclosure.
Figure 5B:
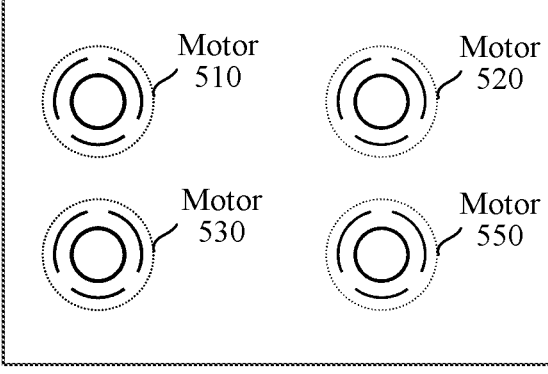
FIG. 5b is a schematic diagram of a distribution of vibration objects of another service terminal according to an embodiment of this disclosure.

In this embodiment of this disclosure, the application client may use the API of the service terminal to identify the vibration objects included in the service terminal and the distribution of the vibration objects, thereby obtaining the vibration ability of the service terminal. FIG. 5a is a schematic diagram of a distribution of vibration objects of a service terminal according to an embodiment of this disclosure. It can be known from FIG. 5a that the current service terminal may provide two vibration objects. The two vibration objects may be a motor 501 and a sensor 502 respectively. In another example, FIG. 5b is a schematic diagram of a distribution of vibration objects of another service terminal according to an embodiment of this disclosure. It can be known from FIG. 5b that the current service terminal may provide four vibration objects. The four vibration objects may be a motor 510, a motor 520, a motor 530, and a motor 540 respectively. The application client may also obtain the attribute parameter of each vibration object (including any one of the coordinate and the orientation), and then determine the vibration ability information of the service terminal on the basis of the obtained attribute parameter of each vibration object.

In this embodiment of this disclosure, the application client may configure the vibration description file of the target service scenario according to a scenario requirement of the target service scenario. At this time, the configured vibration description file may be a vibration description file commonly used in various types of service terminals.

For example, if the target service scenario is any game scenario in the game application, the application client may make corresponding configurations according to a game effect that the game scenario needs to achieve. The scenario requirement of the game scenario is as follows. If a game effect of a virtual fight between two game characters needs to be achieved, the application client may determine, on the basis of the scenario requirement of the game scenario and the expected game effect, a quantity of vibration objects (for example, two vibration objects) that need to be used under the expected game effect and attribute parameters (for example, there is one vibration object in each of east and south orientations) corresponding to the vibration objects from a content terminal (an application client).

In another example, the target service scenario is any information interaction scenario in an instant messaging application, for example, the information interaction scenario is a scenario where multiple social users join in a group chat. For any social user A, if there is social user B that social user A cares about among the multiple social users in the group chat, social user A can be reminded when social user B that social user A cares about posts a social message in the group chat. The application client may determine, on the basis of the expected reminding effect, a quantity of vibration objects (for example, one vibration object) that needs to be used in the target service scenario and the attribute parameter corresponding to each vibration object.

Based on the above manner, the application client may make corresponding configurations for the scenario requirements of different service scenarios that need to be vibrated, thereby obtaining a plurality of vibration description files that can be commonly used in various types of service terminals. One service scenario may correspond to one vibration description file.

In this embodiment of this disclosure, after the application client obtains the vibration description files applicable to the target service scenarios commonly used in the various types of service terminals, the service processing method may further include the application client obtains a vibration ability of the service terminal. The application client may first obtain vibration ability information of the service terminal through an API provided by the service terminal. The vibration ability information is used for indicating the vibration ability of the service terminal. The vibration ability information includes M vibration objects that are provided by the service terminal and attribute parameters of the M vibration objects. The vibration objects include any one of the following: a motor and a sensor. Then, the application client updates the vibration description file of the target service scenario according to the vibration ability of the service terminal, so that the updated vibration description file of the target service scenario matches the vibration ability of the service terminal. This allows the updated vibration description file of the target service scenario to be applied to the service terminal to be personalized, achieving a personalized vibration configuration for the service terminal.

For example, if the target service scenario is any game scenario in the game application, the application client may make corresponding configurations according to a game effect that the game scenario needs to achieve. If the game scenario needs to achieve a game effect of a virtual fight between four game characters, the application client may determine, on the basis of the expected game effect, a quantity of vibration objects (for example, four vibration objects) that need to be used under the game effect and attribute parameters (for example, there is one vibration object in each of east, south, west, and north orientations) corresponding to the various vibration objects. For example, if the currently obtained vibration ability of the service terminal indicates that the service terminal includes six vibration objects, the application client may select four vibration objects, which can achieve the expected game effect, from the six vibration objects on the basis of the scenario requirement, and obtain attribute parameters of the selected four vibration objects, to update the vibration description file of the target service scenario. In another example, if the currently obtained vibration ability information of the service terminal indicates that the service terminal includes three vibration objects, the application client may update the vibration description file of the target service scenario according to the three vibration objects and the attribute parameters of the three vibration objects.

It is understood that the application client can make the personalized configuration with reference to the vibration ability of the current service terminal on the basis of the scenario requirement of the target service scenario, so that the generated vibration description file can better adapt to the vibration ability of the current service terminal in the target service scenario, thereby improving the vibration effect of the service terminal.

In this embodiment of this disclosure, the application client may configure the vibration description file of the target service scenario according to the scenario requirement of the target service scenario, which may include first determining a vibration source in the target service scenario according to the scenario requirement of the target service scenario, and invoking a vibration waveform editor to configure a vibration waveform for the vibration source; and invoking the vibration waveform editor to edit the vibration waveform, and generating the vibration description file of the target service scenario.

In this embodiment of this disclosure, the application client invokes the vibration waveform editor to edit the vibration waveform, and generates the vibration description file of the target service scenario, which may include: First, the application client invokes the vibration waveform editor to adjust the vibration waveform, to obtain initial parameters of the vibration source. Then, the application client invokes the vibration waveform editor to perform vibration simulation according to the initial parameters of the vibration source, and compares a matching degree between a vibration effect generated by the vibration simulation and the target service scenario. Next, the application client invokes the vibration waveform editor to optimize the initial parameters of the vibration source according to the matching degree, and obtains vibration parameters of the vibration source. Finally, the application client generates the vibration description file of the target service scenario according to the vibration parameters of the vibration source.

In this embodiment of this disclosure, the application client may use a vibration editing tool (for example, the vibration waveform editor) to edit the waveform of the vibration source in the target service scenario that needs to be vibrated to obtain the corresponding vibration waveform. For example, the application client uses the vibration waveform editor to generate the vibration waveform that matches the vibration source in the target service scenario, adjusts the vibration waveform, and obtains the initial parameters of the vibration source after the adjustment. In addition, the application client may also use the vibration waveform editor to perform a simulation test on the vibration effect required to be achieved in the target service scenario. The simulation test may include the vibration simulation according to the initial parameters of the vibration source. The matching degree between the vibration effect generated by the vibration simulation and the designated vibration effect corresponding to the target service scenario is compared. If the matching degree after the simulation test reaches a matching degree threshold, the initial parameters of the vibration source may be directly used as the vibration parameters of the vibration source. If the matching degree after the simulation test does not reach the matching degree threshold, it is necessary to optimize the initial parameters of the vibration source according to the matching degree, and the optimized initial parameters are determined as the vibration parameters of the vibration source. Finally, the application client generates the vibration description file of the target service scenario according to the vibration parameters of the vibration source.

The vibration waveform editor may optimize the initial parameters of the vibration source in the following way. The vibration waveform editor edits and adjusts the vibration waveform of the vibration source again, and then determines the optimized initial parameters of the vibration source according to the edited and adjusted vibration waveform. Next, the vibration waveform editor repeats the vibration simulation operation according to the optimized initial parameters of the vibration source until the matching degree between the vibration effect generated by the vibration simulation and the designated vibration effect corresponding to the target service scenario reaches the matching degree threshold. Finally, the vibration waveform editor determines the vibration parameters of the vibration source, and generates the vibration description file of the target service scenario according to the vibration parameters of the vibration source.

In this embodiment of this disclosure, the vibration description file of the target service scenario transmitted by the application client to the service terminal can be transmitted in the form of an encoded data array, a data linked list, a sheet, or the like. This embodiment of this disclosure does not specifically limit the transmission manner of the vibration description file.

In this embodiment of this disclosure, by way of example, the vibration description file is transmitted in an encoded data array, which is used for explanation. FIG. 6 is a schematic diagram of a vibration description file according to an embodiment of this disclosure. As shown in FIG. 6, the vibration description file of the target service scenario may include vibration parameters of a vibration source in a target service scenario. The vibration parameters include an attribute parameter of the vibration source in the target service scenario and a control parameter configured for the vibration source in the target service scenario. Moreover, the vibration parameters may include a plurality of fields, a type of each field, and an explanation and related remarks of each field. For example, if a field is "Time", and the type is "Shaping", the field is used for representing "vibration start time, in ms"; if a field is "Duration", and the type is "Shaping", the field is used for representing "vibration duration, in ms"; and if a field is "Freq", and the type is "Shaping", the field is used for representing "vibration frequency, ranging from 0 to 100". In another example, if a field is "Intensity", and the type is "Shaping", the field is used for representing "vibration intensity, ranging from 0 to 100". The above fields of "shaping" may be used for representing the control parameter of the vibration source. In still another example, if a field is "Coordinate", and the type is "Shaped two-dimensional data", the field is used for representing a coordinate of the vibration source. The field of "Shaped two-dimensional data" may be used for representing the attribute parameter of the vibration source, for example, the coordinate, the orientation, and the like.

In step 430, the vibration description file is transmitted to a service terminal, so that the service terminal drives an adapted target vibration object to vibrate according to the vibration description file in the target service scenario.

In this embodiment of this disclosure, the application client can also detect whether the vibration description file of the target service scenario matches the vibration ability of the service terminal before transmitting the vibration description file of the target service scenario to the service terminal. If the vibration description file of the target service scenario matches the vibration ability, the step of transmitting the vibration description file of the target service scenario to the service terminal is executed. If the vibration description file of the target service scenario does not match the vibration ability, the step of transmitting the vibration description file of the target service scenario to the service terminal is not executed, but the vibration description file is updated on the basis of the vibration ability of the service terminal.

In this embodiment of this disclosure, in a case that the obtained vibration description file is applicable to various types of service terminals, the application client may continue to determine whether the vibration description file of the target service scenario matches the vibration ability of the service terminal.

For example, the vibration description file of the target service scenario includes four vibration objects in the target service scenario and attribute parameters corresponding to the various vibration objects. In addition, the vibration ability information of the service terminal obtained by the application client includes six vibration objects that can be provided by the service terminal and attribute parameters of the six vibration objects. The application client determines, according to the four desired vibration objects in the vibration description file, the attribute parameter of each of the four vibration objects, the six vibration objects that can be provided by the service terminal, and the attribute parameter of each of the six vibration objects, whether the vibration description file of the target service scenario matches the vibration ability of the service terminal. For example, if the four vibration objects are located in east, south, west, and north orientations, and the six vibration objects provided by the service terminal include vibration objects located in the east, south, west, and north orientations, the application client may determine that the vibration description file of the target service scenario matches the vibration ability of the service terminal. For another example, if the four vibration objects are located in east, south, west, and north orientations, and the six vibration objects provided by the service terminal include vibration objects located in the east orientation, the application client may determine that the vibration description file of the target service scenario does not match the vibration ability of the service terminal.

Of course, when the application client determines whether the vibration description file of the target service scenario matches the vibration ability of the service terminal, the application client may also continue to make the determination according to the control parameters of the vibration objects. For example, in a case that it is determined that the attribute parameters of the vibration objects match, it is also necessary to determine the control parameter corresponding to each vibration object. The control parameter includes at least one of the following: vibration start time, a vibration duration, vibration end time, a vibration frequency, and vibration intensity. When the control parameters of the various vibration sources included in the vibration description file match the control parameters of the vibration objects that can be provided by the service terminal, it can be determined that the vibration description file of the target service scenario matches the vibration ability of the service terminal.

It is understood that before transmitting the vibration description file of the target service scenario to the service terminal, the application client first detects whether the vibration ability of the service terminal matches the vibration description file configured in advance by the application client, and executes, only after determining that the vibration ability matches the vibration description file, the step of transmitting the vibration description file of the target service scenario to the service terminal. In this way, the service terminal can achieve accurate vibration on the basis of vibration description file, thus improving the vibration effect. In addition, in a case that the vibration ability of the service terminal does not match the vibration description file, the resource consumption caused by invalid data transmission is reduced, thereby improving the vibration efficiency.

In this embodiment of this disclosure, if the target service scenario is any game scenario in the game application, vibration prompt information may be output in the target service scenario. The vibration prompt information is used for prompting vibration to be triggered in the target service scenario, that is, vibration is about to be triggered in the target service scenario. The vibration prompt information may be displayed in the user interface of the service terminal through a text, a voice, a floating window, a horse race lamp, and the like, to remind a user that vibration is about to be triggered in the target service scenario.

Next, a processing process of the service processing method of this embodiment of this disclosure when the target service scenario is a game scenario will be explained with reference to the above description.

For example, FIG. 7 is a flowchart of wave generation of a game scenario according to an embodiment of this disclosure. Firstly, motors are firstly identified. That is, the application client may use the API of the service terminal to identify vibration objects (such as motors) included in the service terminal and a distribution of the vibration objects, and obtain vibration ability information of the service terminal according to the distribution of the vibration objects in the service terminal. Then, the obtained vibration ability information of the service terminal may be prompted to a user, so that the user can make personalized configurations on a corresponding vibration description file for the service terminal on the basis of the vibration ability information of the service terminal. In this way, the application client obtains a personalized configured vibration description file. Then, scenarios are identified. That is, the application client identifies various game scenarios in a game application. If it is identified that a target service scenario is a service scenario that needs to be vibrated, a vibration waveform matching the target service scenario is obtained (where the vibration waveform may be transmitted in the form of a vibration description file). Finally, the application client transmits the vibration description file matching the target service scenario to the service terminal, so that the service terminal drives an adapted motor or sensor to vibrate according to the vibration description file corresponding to the target service scenario. Correspondingly, the service terminal displays a corresponding interface for the user to watch through page rendering in the vibration process.

In this embodiment of this disclosure, when identifying that the target service scenario is a service scenario that needs to be vibrated, the application client can obtain a vibration description file of the target service scenario, the vibration description file of the target service scenario including vibration parameters of a vibration source in the target service scenario. The application client transmits the vibration description file of the target service scenario to the service terminal. The service terminal finds the target vibration object on the basis of the vibration description file of the target service scenario, and drives the target vibration object to vibrate according to the vibration description file of the target service scenario in the target service scenario, so that the service terminal finds the vibration object on the basis of an actual requirement of the service side. The target vibration object matching the target service scenario can be selected to provide a vibration service for the target service scenario, and it can also be ensured that a vibration effect of the target vibration object meets the scenario requirement of the target service scenario, thereby improving the vibration effect. In addition, the vibration object of the service terminal is driven to vibrate on the basis of the vibration description file of the target service scenario configured on the application client side, so that the vibration object of the service terminal can adapt to the application client. In a case of mutual adaptation between the application client and the service terminal, the vibration efficiency of the vibration object of the service terminal can be improved.

Next, FIG. 8 is a flowchart of another service processing method according to an embodiment of this disclosure. The service processing method may be performed by a service terminal. The service terminal may be, for example, a game terminal, a terminal device in a live streaming scenario, an instant messaging terminal, and the like. As shown in FIG. 7, the service processing method may include step 810 to step 830. The various steps will be explained below separately.

In step 810, in a case that an application client identifies that a target service scenario is a to-be-vibrated service scenario, a vibration description file of the target service scenario transmitted by the application client is received, the vibration description file including vibration parameters of a vibration source in the target service scenario.

After receiving the vibration description file of the target service scenario transmitted by the application client, the service terminal may also verify identity information of the application client. If the identity information of the application client succeeds in the verification, the vibration description file of the target service scenario transmitted by the application client is obtained. Identity information of a client may include an identifier of the client. This embodiment of this disclosure does not specifically limit this. The security of the vibration description file obtained by the service terminal can be ensured by verifying the identity information.

In step 820, an adapted target vibration object is determined according to the vibration description file.

There may be one or more target vibration objects. A vibration object may be at least one of a motor and a sensor. Of course, the vibration object may also be another device that can perform a vibration operation. This embodiment of this disclosure does not specifically limit this.

In this embodiment of this disclosure, the vibration parameters include attribute parameters of the vibration source in the target service scenario. The attribute parameter includes any one of the following: a coordinate and an orientation. The service terminal determines the adapted target vibration object according to the vibration description file of the target service scenario, which may include the following steps. Firstly, the service terminal obtains vibration ability information, the vibration ability information being used for indicating a vibration ability of the service terminal, the vibration ability information including M vibration objects that can be provided by the service terminal and attribute parameters of the M vibration objects. Then, the service terminal determines the adapted target vibration object from the M vibration objects on the basis of the attribute parameters, among the vibration parameters, of the vibration source in the target service scenario. The attribute parameters of the target vibration object match the attribute parameters, among the vibration parameters, of the vibration source in the target service scenario.

For example, a vibration object is a motor, and the vibration ability information obtained by the service terminal includes: four motors and a distribution of the four motors in the service terminal, so that the service terminal may determine the attribute parameters of each of the four motors according to the distribution of the four motors in the service terminal. As shown in FIG. 5b, the four motors include a motor 510, a motor 520, a motor 530, and a motor 540. The four motors are uniformly distributed in the service terminal, corresponding to an upper left corner, an upper right corner, a lower left corner, and a lower right corner. Therefore, the attribute parameters of each of the four motors can be determined. If the attribute parameters, among the vibration parameters, of the vibration source in the target service scenario indicate two vibration sources located in the upper left corner and the lower right corner, it can be determined, according to a correspondence relationship between the attribute parameters of the vibration sources and the distribution of the target vibration objects in the service terminal, that the target vibration objects include the motor 510 distributed at the upper left corner and the motor 540 distributed at the lower right corner of the service terminal.

It is understood that the target vibration object that matches the vibration ability information of the service terminal itself can be found on the basis of the vibration description file of the target service scenario transmitted by the application client, so that the scenario requirement configured in advance by the developer can be better met.

In step S830, the target vibration object is driven to vibrate according to the vibration description file in the target service scenario.

In this embodiment of this disclosure, the vibration parameters include a control parameter configured for the vibration source in the target service scenario. The control parameter includes at least one of the following: vibration start time, a vibration duration, vibration end time, a vibration frequency, and vibration intensity. The service terminal drives the target vibration object to vibrate according to the vibration description file of the target service scenario in the target service scenario, which may include: In the target service scenario, the service terminal drives the target vibration object to vibrate according to the control parameter.

For example, the vibration description file may be shown in FIG. 6. The vibration description file may include the vibration parameters of the vibration source in the target service scenario. The vibration parameters include the control parameter configured for the vibration source in the target service scenario. The control parameter shown in FIG. 6 may include the following information: vibration start time (in ms), a vibration duration (in ms), vibration end time (in ms, the vibration end time may be calculated according to the vibration start time and the vibration duration, or may be directly configured), a vibration frequency (in a range of 0-100), and vibration intensity (in a range of 0-100).

In this embodiment of this disclosure, the service terminal drives the corresponding target vibration object to vibrate in the target service scenario according to the information included in the control parameter. For example, if the target service scenario is any game scenario in a game application, the service terminal drives the target vibration object to vibrate and performs page rendering through a rendering engine in the service terminal, to display a picture to a user. The displayed picture may be: a game picture when two game characters engage in virtual fight, or a game picture when any game character undergoes virtual rotation, virtual jump, or virtual movement in a game process. For another example, if the target service scenario is any live streaming scenario in a live streaming application, the service terminal drives the target vibration object to vibrate and performs page rendering through a rendering engine in the service terminal, to display a picture to a user. The displayed picture may be: a live streaming picture presented when a live streamer user performs a talent show (singing, dancing, and the like) during live streaming. For still another example, if the target service scenario is any information interaction scenario in an instant messaging application, the service terminal drives the target vibration object to vibrate and performs page rendering through a rendering engine in the service terminal, to display a picture to a user. The displayed picture may be: a chat picture when a social user receives a social message sent by another social user, a window interface corresponding to the social message is flickering or shaking.

The service processing method according to this embodiment of this disclosure generates the vibration description file of the target service scenario the application client side on the basis of the editing performed by a user or a developer on the vibration waveform corresponding to the target service scenario. With reference to the interaction between the service terminal and the application client, the service terminal can perform vibration on the basis of a finally determined vibration policy among vibration policies where the service terminal determines to drive the target vibration object to vibrate according to the vibration description file in the target service scenario. It can be seen that the service processing method provided in this embodiment of this disclosure not only considers needs of the application client, but also takes into account vibration characteristics of the service terminal itself, achieving a matching effect between the service terminal and the application client, thereby improving the vibration effect of the service terminal in the vibration process.

Figure 9:
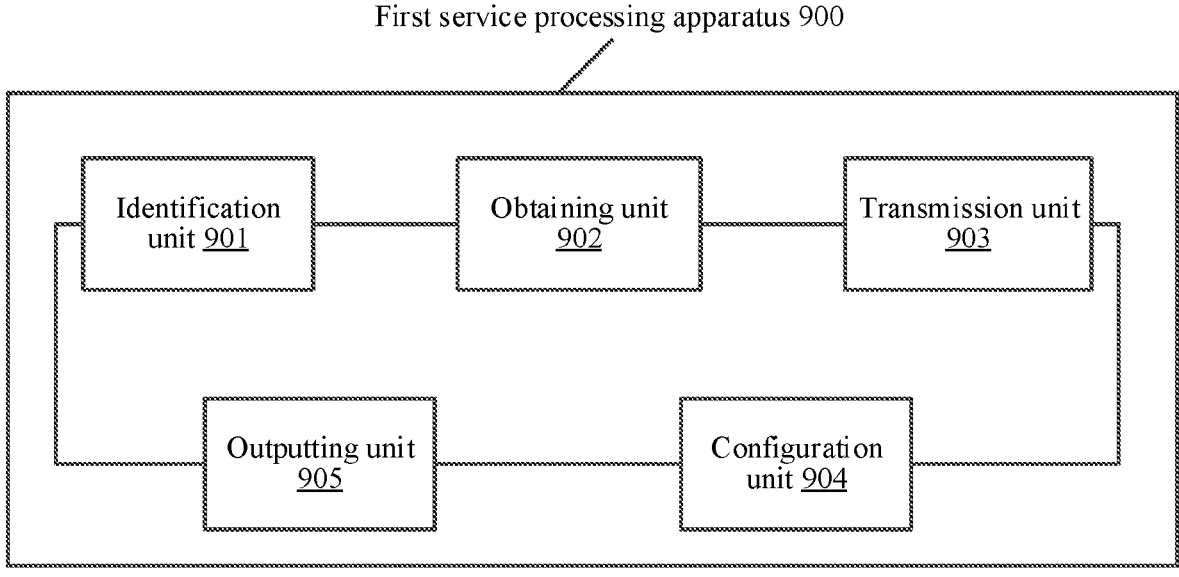
FIG. 9 is a schematic structural diagram of a service processing apparatus according to an embodiment of this disclosure.

FIG. 9 is a schematic structural diagram of a service processing apparatus according to an embodiment of this disclosure. A first service processing apparatus 900 may be applied to the application client corresponding to FIG. 4. The first service processing apparatus 900 may be a computer program (including program codes) run in a lightweight node, for example, the first service processing apparatus 900 is application software. The first service processing apparatus 900 may be configured to implement the service processing method on the application client side according to the embodiments of this disclosure. The following will explain various units included in the first service processing apparatus 900 separately.

An identification unit 901 is configured to obtain identify a target service scenario.

An obtaining unit 902 is configured to obtain, in a case that it is identified that the target service scenario is a to-be-vibrated service scenario, a vibration description file of the target service scenario, the vibration description file including vibration parameters of a vibration source in the target service scenario.

A transmission unit 903 is configured to transmit the vibration description file to a service terminal, the service terminal being configured to drive an adapted target vibration object to vibrate according to the vibration description file in the target service scenario.

In this embodiment of this disclosure, the first service processing apparatus 900 further includes a configuration unit 904, configured to configure the vibration description file according to a scenario requirement of the target service scenario. The vibration parameters include at least one of the following: an attribute parameter and a control parameter. The attribute parameter includes at least one of the following: a coordinate and an orientation. The control parameter includes at least one of the following: vibration start time, a vibration duration, vibration end time, a vibration frequency, and vibration intensity.

In this embodiment of this disclosure, the configuration unit 904 is further configured to: determine the vibration source in the target service scenario according to the scenario requirement of the target service scenario; configure a vibration waveform for the vibration source; and edit the vibration waveform to generate the vibration description file.

In this embodiment of this disclosure, the configuration unit 904 is further configured to: adjust the vibration waveform to obtain initial parameters of the vibration source; perform vibration simulation according to the initial parameters of the vibration source; compare a matching degree between a vibration effect generated by the vibration simulation and a designated vibration effect corresponding to the target service scenario; optimize the initial parameters of the vibration source according to the matching degree to obtain the vibration parameters; and generate the vibration description file according to the vibration parameters.

In this embodiment of this disclosure, the configuration of the vibration waveform and the editing of the vibration waveform are both achieved by invoking a vibration waveform editor.

In this embodiment of this disclosure, the configuration unit 904 is further configured to obtain a vibration ability of the service terminal; and update the vibration description file according to the vibration ability of the service terminal, the updated vibration description file matching the vibration ability of the service terminal.

In this embodiment of this disclosure, the configuration unit 904 is further configured to obtain vibration ability information of the service terminal by invoking an application program interface (API) provided by the service terminal, the vibration ability information being used for indicating the vibration ability of the service terminal, where the vibration ability information including M vibration objects in the service terminal, and attribute parameters of the M vibration objects, and M is a positive integer; and the vibration objects include any one of: a motor and a sensor.

In this embodiment of this disclosure, the target service scenario is any game scenario in a game application. The first service processing apparatus 900 further includes an outputting unit 905, configured to output vibration prompt information in the target service scenario, the vibration prompt information being used for prompting vibration to be triggered in the target service scenario.

Figure 10:
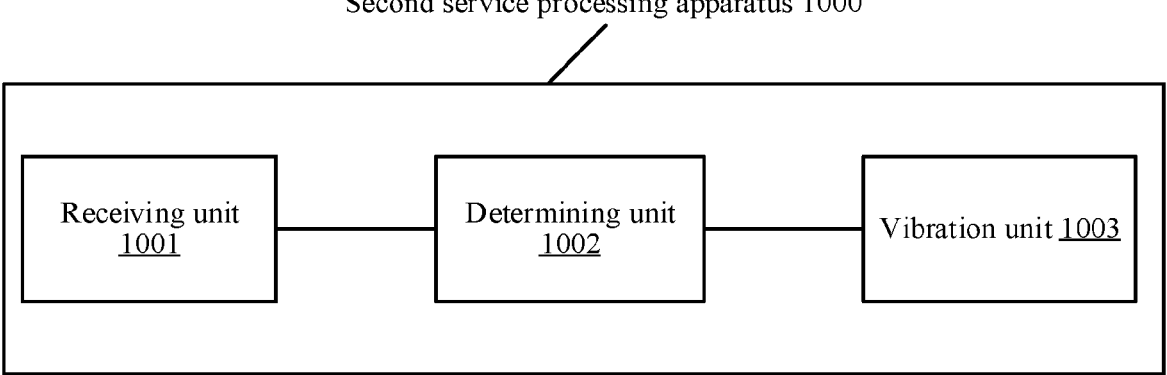
FIG. 10 is a schematic structural diagram of another service processing apparatus according to an embodiment of this disclosure.

FIG. 10 is a schematic structural diagram of another service processing apparatus according to an embodiment of this disclosure. A second service processing apparatus 1000 may be applied to the service terminal corresponding to FIG. 8. The second service processing apparatus 1000 may be a computer program (including program codes) run in a lightweight node, for example, the second service processing apparatus 1000 is application software. The second service processing apparatus 1000 may be configured to implement the service processing method on the service terminal side according to the embodiments of this disclosure. The following will explain various units included in the second service processing apparatus 1000 separately.

A receiving unit 1001 is configured to receive a vibration description file of a target service scenario transmitted by an application client, the vibration description file being transmitted in a case that the application client identifies that the target service scenario is a to-be-vibrated service scenario, and the vibration description file including vibration parameters of a vibration source in the target service scenario.

A determining unit 1002 is configured to determine an adapted target vibration object according to the vibration description file.

A vibration unit 1003 is configured to drive the target vibration object to vibrate according to the vibration description file in the target service scenario.

In this embodiment of this disclosure, the vibration parameters include at least one of the following: an attribute parameter and a control parameter. The attribute parameter includes at least one of the following: a coordinate and an orientation. The control parameter includes at least one of the following: vibration start time, a vibration duration, vibration end time, a vibration frequency, and vibration intensity.

In this embodiment of this disclosure, when the vibration parameters include the attribute parameter, the determining unit 1002 is further configured to: obtain vibration ability information, the vibration ability information being used for indicating a vibration ability of a service terminal, the vibration ability information including M vibration objects in the service terminal and attribute parameters of the M vibration objects, and M being a positive integer; and determine the adapted target vibration object from the M vibration objects according to the attribute parameter, the attribute parameter of the target vibration object matching the attribute parameter.

In this embodiment of this disclosure, when the vibration parameters include the control parameter, the vibration unit 1003 is further configured to drive the target vibration object to vibrate according to the control parameter in the target service scenario.

Figure 11:
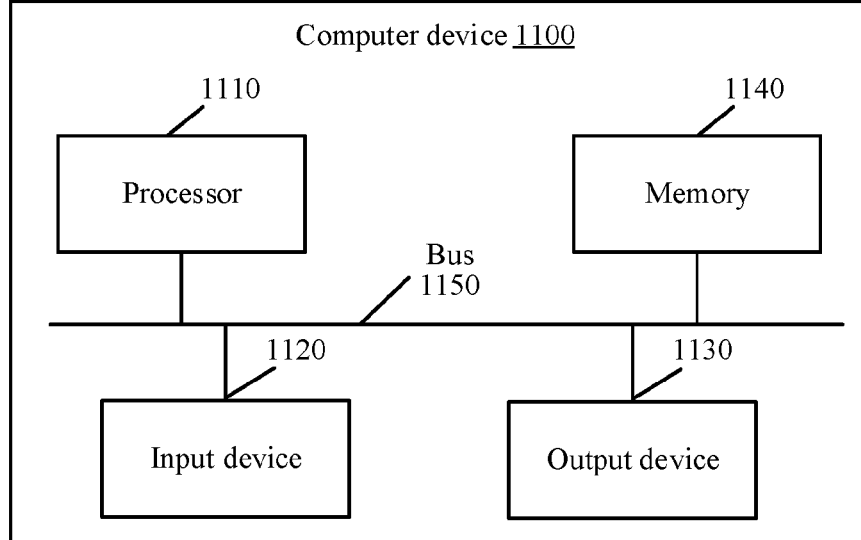
FIG. 11 is a schematic structural diagram of a computer device according to an embodiment of this disclosure.

FIG. 11 is a schematic structural diagram of a computer device according to an embodiment of this disclosure. The computer device 1100 (referred to as an electronic device for service processing) is configured to execute the steps of FIG. 4 and FIG. 8. The computer device 1100 includes: one or more processors 1110; one or more input devices 1120, one or more output devices 1130, and a memory 1140. The processor 1110, the input device 1120, the output device 1130, and the memory 1140 are connected by a bus 1150. The memory 1140 is configured to store a computer program. The computer program includes program instructions. The processor 1110 is configured to invoke program instructions stored in the memory 1140 to implement the service processing method on the application client side or the service terminal side.

It is understood that the computer device described in the embodiments of this disclosure can execute the descriptions of the service processing methods corresponding to FIG. 4 and FIG. 8, as well as the descriptions of the first service processing apparatus 900 corresponding to FIG. 9 and the second service processing apparatus 1000 corresponding to FIG. 10, which will not be further elaborated here. In addition, the descriptions of the beneficial effects of the same service processing methods are not described here again.

In addition, the embodiments of this disclosure further provide a computer storage medium, such as a non-transitory computer-readable storage medium. The computer storage medium stores computer programs run in the first service processing apparatus 900 and the second service processing apparatus 1000, and the computer program includes program instructions. When a processor executes the program instructions, the process can implement the service processing methods corresponding to FIG. 4 and FIG. 8.

As an example, the program instructions used for implementing the service processing methods may be deployed on a computer device for execution, or on a plurality of computer devices located at one site for execution, or on a plurality of computer devices distributed at a plurality of sites and interconnected by a communication network for execution, and the plurality of computer devices distributed at the plurality of sites and interconnected by the communication network can form a blockchain system.

The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

The embodiments of this disclosure provide a computer program product or a computer program. The computer program product or computer program includes computer instructions which are stored in a computer-readable storage medium. A processor of a computer device reads the computer instructions from the computer-readable storage medium and executes the computer instructions, causing the computer device to implement the service processing methods corresponding to FIG. 4 and FIG. 8.

What is disclosed above is merely exemplary embodiments of this disclosure, and certainly is not intended to limit the scope of the disclosure. Therefore, equivalent variations shall fall within the scope of this disclosure.

What is claimed is:

1. A computer-implemented method for generating a vibration for a target vibration scenario, the method comprising:

determining, by processing circuitry, the target vibration scenario associated with a virtual object in an application;

obtaining, by the processing circuitry, a vibration waveform of the virtual object that is associated with the target vibration scenario;

editing, by the processing circuitry via a vibration waveform editor, the vibration waveform;

generating, by the processing circuitry via the vibration waveform editor, initial parameters of the virtual object based on the edited vibration waveform;

generating, by the processing circuitry and via the vibration waveform editor, a vibration description file for the virtual object based on a vibration simulation that is performed with the initial parameters of the virtual object, the vibration description file including (i) a first parameter that indicates a location of the virtual object, and (ii) a second parameter indicating an attribute of the vibration; and transmitting, by the processing circuitry, the vibration description file to a service terminal, the service terminal being configured to select a vibration object based on the location of the virtual object and to control the selected vibration object to vibrate in accordance with the attribute of the vibration.

2. The method according to claim 1, wherein the target vibration scenario is a predetermined event associated with the virtual object in the application executed by the service terminal.

3. The method according to claim 1, further comprising:

configuring, by the processing circuitry, the vibration waveform according to a requirement of the target vibration scenario;

wherein the first parameter indicates at least one of a coordinate or an orientation, and the second parameter indicates the attribute of the vibration associated with at least one of a vibration start time, a vibration duration, a vibration end time, a vibration frequency, or vibration intensity.

4. The method according to claim 3, wherein the configuring the vibration waveform comprises:

determining the virtual object in the target vibration scenario based on the requirement of the target vibration scenario; and configuring the vibration waveform for the virtual object.

5. The method according to claim 4, wherein the editing the vibration waveform comprises:

adjusting the vibration waveform to obtain the initial parameters of the virtual object; and the generating comprises:

performing the vibration simulation with the initial parameters of the virtual object;

performing a comparison of a simulated vibration effect generated by the vibration simulation to a designated vibration effect corresponding to the target vibration scenario;

modifying the initial parameters of the vibration object based on the comparison to obtain updated vibration parameter information; and generating the vibration description file based on the updated vibration parameter information.

6. The method according to claim 4, wherein the vibration waveform editor is configured to obtain and edit the vibration waveform.

7. The method according to claim 3, further comprising:

obtaining a vibration capability of the service terminal; and updating the vibration description file based on the vibration capability of the service terminal.

8. The method according to claim 7, wherein the obtaining the vibration capability includes obtaining vibration capability information of the service terminal via an application program interface (API) of the service terminal, the vibration capability information indicating the vibration capability of the service terminal, the vibration capability information indicates M vibration objects in the terminal, attribute parameters of the M vibration objects, and the vibration objects include a motor.

9. The method according to claim 1, wherein the target vibration scenario is a game scenario in a game application, and the method further comprises:

outputting vibration prompt information in the game scenario to trigger the vibration based on the vibration description file.

10. A method for generating a vibration for a target vibration scenario, the method comprising:

obtaining, by processing circuitry of a service terminal, a vibration description file corresponding to the target vibration scenario associated with a virtual object, the vibration description file indicating a target vibration effect based on (i) a first parameter that indicates a coordinate of a location of the virtual object in a game picture on the service terminal, and (ii) a second parameter indicating an attribute of the vibration;

determining, by the processing circuitry, a target vibration object from a plurality of vibration objects of the service terminal, a distance between the target vibration object and the location of the virtual object being less than a threshold; and driving the target vibration object based on the attribute of the vibration.

11. The method according to claim 10, wherein the second parameter indicates at least one of a vibration start time, a vibration duration, a vibration end time, a vibration frequency, or vibration intensity.

12. The method according to claim 10, wherein the determining the target vibration object comprises:

obtaining, by the processing circuitry, vibration capability information indicating a vibration capability of the service terminal, the vibration capability information indicating M vibration objects in the service terminal and coordinates of locations of the M vibration objects.

13. The method according to claim 12, further comprising:

obtaining initial vibration parameters of the virtual object that are associated with the target vibration scenario; and generating, by the processing circuitry, the vibration description file based on the initial vibration parameters and the vibration capability information.

14. An information processing apparatus, comprising: processing circuitry configured to:

determine a target vibration scenario associated with a virtual object in an application;

obtain a vibration waveform of the virtual object that is associated with the target vibration scenario;

edit, via a vibration waveform editor, the vibration waveform;

generate, via the vibration waveform editor, a vibration description file for the virtual object based on a vibration simulation that is performed with initial parameters of the virtual object, the vibration description file including (i) a first parameter that indicates a location of the virtual object, and (ii) a second parameter indicating an attribute of the vibration; and transmit the vibration description file to a service terminal, the service terminal being configured to select a vibration object based on the location of the virtual object and to control the selected vibration object to vibrate in accordance with the attribute of the vibration.

15. The information processing apparatus according to claim 14, wherein the target vibration scenario is a predetermined event associated with the virtual object in the application executed by the service terminal.

16. The information processing apparatus according to claim 14, wherein the processing circuitry is configured to configure the vibration waveform according to a requirement of the target vibration scenario, and the first parameter indicates at least one of a coordinate or an orientation, and the second parameter indicates the attribute of the vibration associated with at least one of a vibration start time, a vibration duration, a vibration end time, a vibration frequency, or vibration intensity.

17. The information processing apparatus according to claim 16, wherein the processing circuitry is configured to:

determine the virtual object in the target vibration scenario based on the requirement of the target vibration scenario; and configure the vibration waveform for the virtual object.

18. The information processing apparatus according to claim 17, wherein the processing circuitry is configured to adjust the vibration waveform to obtain the initial parameters of the virtual object;

perform the vibration simulation according to the initial parameters of the virtual object;

perform a comparison of a simulated vibration effect generated by the vibration simulation to a designated vibration effect corresponding to the target vibration scenario;

modify the initial parameters of the vibration object based on the comparison to obtain updated vibration parameter information; and generate the vibration description file based on the updated vibration parameter information.

19. The information processing apparatus according to claim 17, wherein the vibration waveform editor is configured to obtain and edit the vibration waveform.

20. The information processing apparatus according to claim 16, wherein the processing circuitry is configured to:

obtain a vibration capability of the service terminal; and update the vibration description file based on the vibration capability of the service terminal.

* * * * *